United States Patent [19]

Matsumura et al.

[11] Patent Number: 4,618,543
[45] Date of Patent: Oct. 21, 1986

[54] FUSED CARBONATE-TYPE FUEL CELL

[75] Inventors: Mitsuie Matsumura, Ashiya; Motomu Yoshimura, Kishiwada; Hiroaki Urushibata, Kawanishi, all of Japan

[73] Assignee: Mitsubishi Denki Kabushiki Kaisha, Tokyo, Japan

[21] Appl. No.: 755,013

[22] Filed: Jul. 15, 1985

[30] Foreign Application Priority Data

Jul. 13, 1984 [JP] Japan .................................. 59-146323

[51] Int. Cl.⁴ .............................................. H01M 8/14
[52] U.S. Cl. ........................................ 429/19; 429/16; 429/34; 429/44
[58] Field of Search ........................ 429/16, 19, 42, 44, 429/46, 34, 12

[56] References Cited

U.S. PATENT DOCUMENTS 3,488,226  1/1970  Baker et al. ............................ 429/16
4,365,007 12/1982  Maru et al. ............................ 429/19

FOREIGN PATENT DOCUMENTS 0115770  7/1983  Japan ..................................... 429/44
0131664  8/1983  Japan ..................................... 429/44

Primary Examiner—Anthony Skapars
Attorney, Agent, or Firm—Burns, Doane, Swecker & Mathis

[57] ABSTRACT

A fused carbonate-type fuel cell is disclosed in which a reforming catalyst body comprising a catalyst supported on a carrier and secured or held in a porous body is arranged in a fuel gas passage. In this fuel cell, a reaction gas is uniformly contacted with the reforming catalyst, propagation of wetting by the electrolyte is prevented, and decrease in activity of the reforming catalyst can be suppressed to a very low level. Furthermore, this catalyst body can be easily handled.

9 Claims, 4 Drawing Figures

FUSED CARBONATE-TYPE FUEL CELL

BACKGROUND OF THE INVENTION

The present invention relates to a fused carbonate-type fuel cell, and especially to the structure of a reforming catalyst body thereof.

Conventionally there have been employed internal reforming types of fused carbonate-type fuel cells employing a reforming catalyst as shown in FIG. 3. The fuel cell as used heretofore and as shown in FIG. 3 comprises an electrolyte matrix 1, an electrode 2 on the fuel gas side, an electrode 3 on the oxidizine gas side, both electrodes being adjacent to opposite surfaces of the matrix 1, a partition plate 4a for supporting the fuel gas side electrode 2 and separating a reforming catalyst 7, as hereinafter described in more detail, from the electrode 2, a supporting plate 4b for supporting the other electrode 3, corrugated plates 5a and 5b, forming reaction gas passages on the fuel gas side and on the oxidizing gas side, respectively, and a separator plate 6. The separator plate 6 acts to separate a fuel gas passage from an oxidizing gas passage and also acts to electrically connect in series a plurality of single cells comprising the electrolyte matrix 1, the electrode 2 on the fuel gas side, and the electrode 3 on the oxidizing gas side when a number of single cells are stacked one another. The reforming catalysts 7, disposed on both sides of the corrugated plate 5a on the fuel gas side, comprises nickel supported on a alumina-magnesia based carrier. These catalysts are commercially available in a spherical or cylindrical form, and are generally several mm in size.

The operation of the above-mentioned cell will now be described. A fuel gas comprising a hydrocarbon and steam as the major components and an oxidizing gas comprising oxygen and carbon dioxide as the major components are fed to the fused carbonate-type fuel cell in a cross flow into the fuel gas passage and the oxidizing gas passage, respectively. The hydrocarbon component in the fuel gas is converted upon contact with the reforming catalyst 7 in the presence of steam to a fuel gas comprising hydrogen and carbon monoxide as the main component as shown in Equations (1)–(3) set forth below:

$$CH_4 + H_2O \longrightarrow CO + 3H_2 + 49.3 \text{ Kcal/mol} \quad (1)$$

$$C_nH_m + nH_2O \longrightarrow nCO + \frac{m + 2n}{2} H_2 \quad (2)$$

$$CO + H_2O \longrightarrow CO_2 + H_2 - 9.8 \text{ Kcal/mol} \quad (3)$$

These reactions are as a whole endothermic and therefore are carried out by utilizing heat produced in the fused carbonate-type fuel cell. The resultant gases containing hydrogen and carbon monoxide diffuse through holes in the partition plate 4a and oxygen and carbon dioxide in the oxidizing gas diffuse through holes in the supporting plate 4b. Thus, the hydrogen and carbon monoxide and the oxygen and carbon dioxide react on the electrode 2 on the fuel gas side and on the electrode 3 on the oxidizing gas side as follows:

On the electrode 2 on the fuel gas side, $$H_2 + CO_3{}^{2-} \rightarrow H_2O + CO_2 + 2e \quad (4)$$

$$CO + H_2O \rightarrow H_2 + CO_2 \quad (5)$$

On the electrode 3 on the oxidizing gas side, $$\tfrac{1}{2}O_2 + CO_2 + 2e \rightarrow CO_3{}^{2-} \quad (6)$$

By these chemical-electrochemical reactions the chemical energy contained in the fuel gas is converted to electrical energy and thermal energy. Most of the thermal energy thus produced is utilized as set forth before to supply the heat required for the reaction heat in order to decompose the hydrocarbons in the gas flow passage by contact with the catalyst 7. This means a significant improvement in heat efficiency, which is one characteristic of the internal reforming system.

In the above system, however, since the commercially available reforming catalysts 7 are in the form of spherical or cylindrical particles it is necessary to hold the particles of the reforming catalyst 7 in the fuel gas passages by packing them as shown in FIG. 3. However, such packing and holding of the catalyst makes its handling very difficult during fabrication of the internally reforming-type fused carbonate salt fuel cell. Also uniform packing of the catalyst is achieved only with difficulty which makes it difficult to achieve uniform contact for the reactant gas with the reforming catalyst 7, with the results that no effective utilization of the reforming catalyst 7 takes place.

Further, the reforming catalyst 7 decreases in activity on contact with an electrolyte contained in the electrode 2 on the fuel gas side or in the electrolyte matrix 1. In order to avoid such a decrease in activity, the catalyst particles must be prevented from making direct contact with the electrolyte by the partition plate 4a. However, the contact of the reforming catalyst 7 and the electrolyte may happen due to vibration or upon supplying the electrolyte. If such contact should occur wetting of only a portion of the catalyst with the electrolyte may spread over a wide area of the catalyst because of the construction being such that the catalyst particles are held in contact with each other, with the results that significant reduction of the activity of the catalyst will take place.

As the fused carbonate-type fuel cells employing the reforming catalyst of the prior art have the constitution as set forth above, they have the drawbacks that resistance to wetting is low, uniform contact between the reforming catalyst and the reaction gases is difficult, and handling upon fabrication of the cells is cumbersome.

SUMMARY OF THE INVENTION

The object of the present invention is to eliminate the drawbacks of the prior art cells. Thus, one object of the present invention is to provide a fused carbonate type fuel cell in which a uniform contact between the reforming catalyst and the reaction gases which makes it possible to efficiently use the catalyst.

Another object of the present invention is to provide a fused carbonate-type fuel cell in which wetting of the catalyst by the electrolyte can be prevented or limited to a minimum.

A further object of the present invention is to provide a fused carbonate-type fuel cell whose catalyst can be easily handled during fabrication of the cell.

The fused carbonate-type fuel cell according to the present invention comprises a fused carbonate type electrolyte matrix 1, electrodes 2 and 3 in contact with the opposite surfaces of the electrolyte matrix 1, one electrode 2 being positioned on the fuel gas side and the other electrode 3 being positioned on the oxidizing gas side, a partition plate 4a for supporting the electrode 2 on the fuel gas side, a supporting plate 4b for supporting the electrode 3 on the oxidizing gas side, a corrugated plate 5b positioned adjacent to the supporting plate 4b for providing gas passages of oxidizing gases, a reforming catalyst body positioned adjacent to the partition plate 4a and a separator plate 6 for separating the fuel gas passages from the oxidizing gas passages in adjacent stacked single fused carbonate-type fuel cell. The improvement comprises said reforming catalyst being disposed in the fuel gas passage by fixing or holding catalyst particles carried on carrier particles in a porous body.

DETAILED DESCRIPTION OF THE INVENTION

Figure 1:
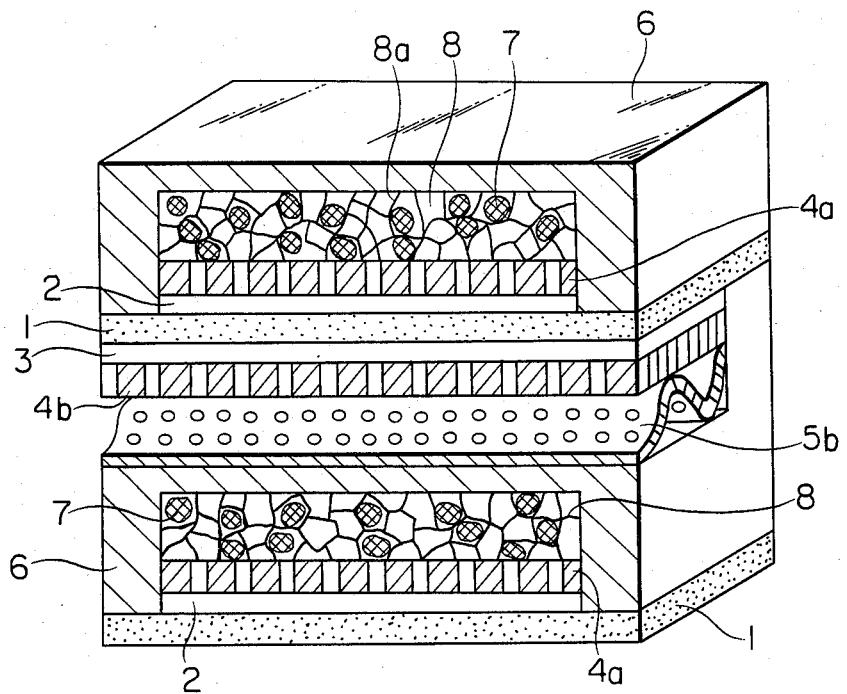
FIG. 1 is a perspective view, partly in section, showing the fused carbonate type fuel cells according to the present invention.

The present invention will be now described with respect to a preferred embodiment thereof while referring to the drawings.

Figure 2:
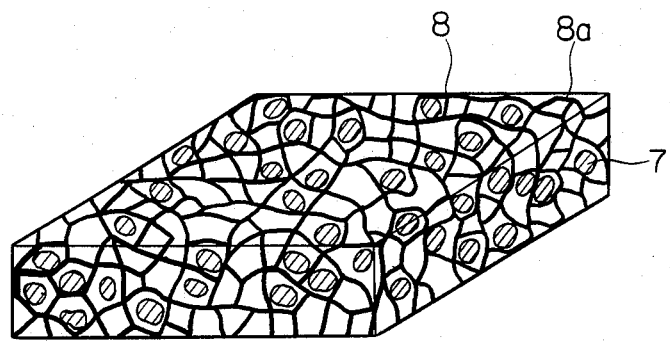
FIG. 2 is a perspective view illustrating the reforming catalyst according to the present invention.
Figure 3:
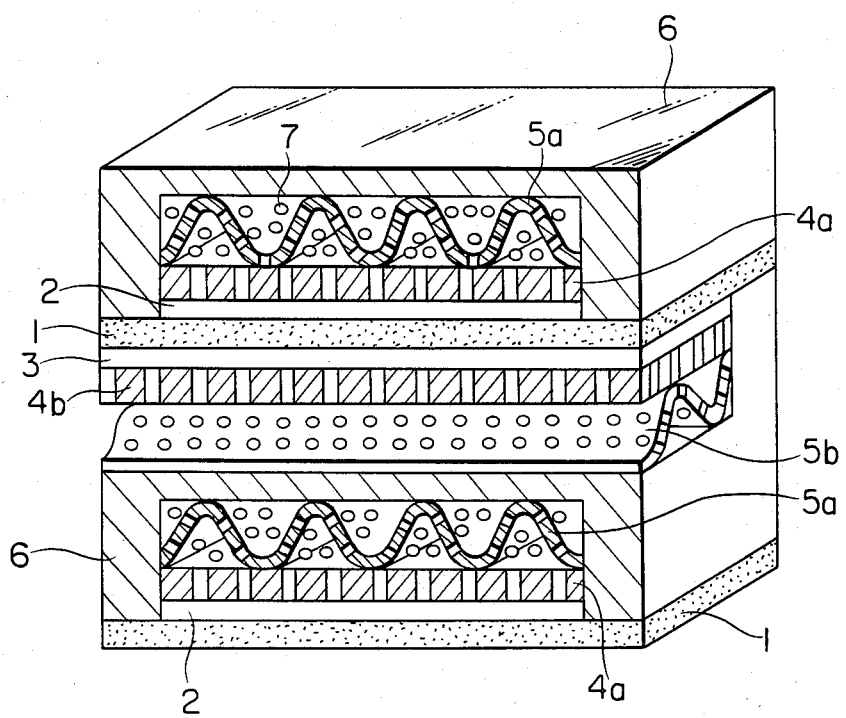
FIG. 3 is a perspective view, partly in section, of a conventional fused carbonate-type fuel cells.

FIG. 2 is a perspective view of the reforming catalyst body 8 which constitutes the key portion of one embodiment the present invention. The reforming catalyst body 8 is composed of a porous mass such as a metallic porous mass 8a and reforming catalyst particles which are fixed or held within the metallic porous mass 8a. The reforming catalyst particles 7 comprise a catalytic active component such as nickel carried on an alumina, magnesia based carrier.

FIG. 1 is a perspective view, partly in section, of the fused carbonate type fuel cell in which the reforming catalyst body 8 is disposed in the fuel gas flow passage. The electrolyte matrix 1, the electrode 2 on the fuel gas side, the electrode 3 on the oxidizing gas side, the partition plate 4a, the supporting plate 4b; the corrugated plate 5b and the separator and the separator plate 6 are all similarly arranged and act in a manner similar to the conventional ones. The reforming catalyst body 8 has the reforming catalyst particles 7 carried on a carrier which is fixed or held therein.

The operation of the fused carbonate-type fuel cell employing the reforming catalyst according to the present invention will now be explained.

A fuel gas comprising hydrocarbons and steam as the main components is fed to the porous reforming catalyst body 8 disposed in the fuel gas flow passage and converted, i.e., reformed to fuel gases based on hydrogen and carbon monoxide by the action of the reforming catalyst 7 according to the reactions in Equations (1), (2) and (3). The resulting hydrogen and carbon monixide diffuse throughout the empty space within the reforming catalyst body 8, after which they pass to the electrode 2 on the fuel gas side via the partition plate 4a. The hydrogen and oxygen are consumed at the electrode according to the reactions set forth in Equations (4) and (6) to produce electric energy and heat energy.

In the embodiment in FIG. 1 according to the present invention, the reforming catalyst 7 is fixed or held by the metallic porous body 8a, thereby obtaining better diffusion of reactant gases and product gases, thus permitting efficient utilization of the reforming catalyst 7.

Moreover, the particles of reforming catalyst 7 are integrated with the metallic porous body 8a, which facilitates the handling of the reforming catalyst 7 upon fabrication of the fuel cell.

The fixing or the securely holding of the reforming catalyst 7 in the form of non-mutual contact of said catalyst 7 by the metallic porous body prevents the spreading of wetting by the fused electrolyte caused by the direct contact of the catalyst with each other thereby suppressing the reduction of the catalyst activity to a minimum. Further, by taking advantage of the non-wettability of nickel or nickel base alloy against the electrolyte, that is, utilizing nickel or nickel base alloy as the material for the metallic porous body 8a, wetting by the electrolyte of the reforming catalyst 7 can be effectively prevented.

As the carrier for the catalyst 7, there may preferably be used lithium aluminate ($LiAlO_2$) which is stable against the electrolyte. Thus the catalyst body 8 comprising the metallic porous body 8a composed of nickel or a nickel base alloy and the reforming catalyst 7 carried on a lithium aluminate carrier provides more stable catalyst performance.

In order to maintain good diffusion of the reacting gases and product gases within the reforming catalyst body 8, the porosity of the metallic porous body 8a is of importance and it is preferablely 50-99% and the pore size is desirably 0.5-3 mm. As the metallic porous body 8a, there may be employed sintered metal, foamed metal, and the like. Thereinafter, the method of making foamed metal capable of easily achieving a high porosity will be explained.

Figure 4:
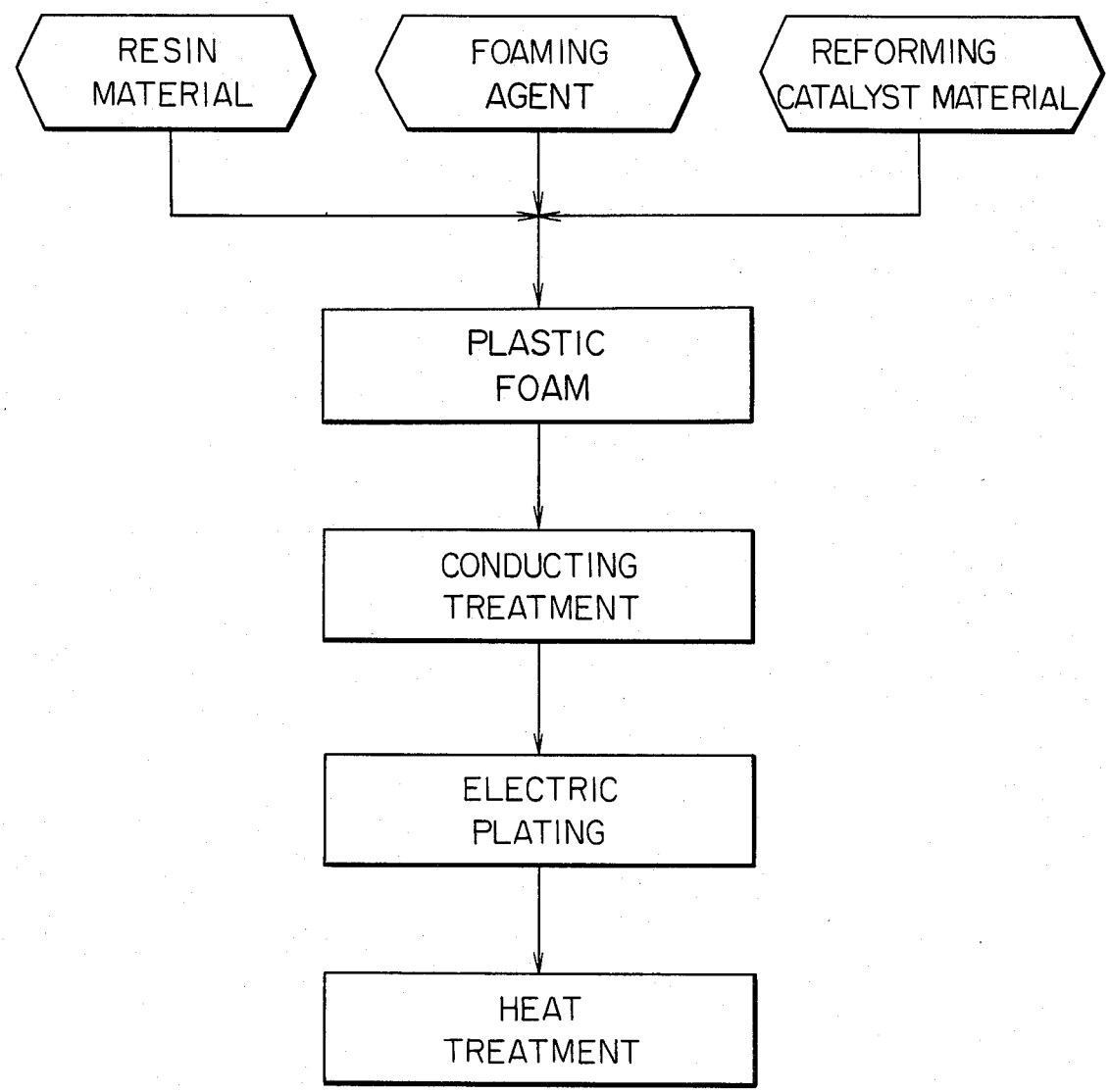
FIG. 4 is a flow sheet for the production of said reforming catalyst according to the present invention.

FIG. 4 illustrates a preparation process using a foamed metal as the porous metal body. A resin material, a foaming agent, and a reforming catalyst material are kneaded at a temperature lower than the foaming temperature of the foaming agent, and the foaming agent is foamed at a temperature higher than the foaming temperature of the foaming agent under pressure adjusted so as to control the foam size. Then, the resin is cured and a plastic foams in which the reforming catalyst material is dispersed is formed. For example, 100 parts by weight of a novolac type phenolic resin as the resin material, 16 parts by weight of benzene sulfonylhydrazide as the foaming agent, 12 parts by weight of hexamethylene-tetramine as the curing agent, and 40 parts by weight of a reforming catalyst (marketed under the tradename of "N-139" by Nikki Kagaku K.K.) are kneaded at 60° C., and hot foaming is effected at 120° C. under normal pressure, and curing is effected at 180° C. to form a plastic foam in which the reforming catalyst is dispersed. In addition, ordinary foamable resins such as polyethylene, polypropylene, polyurethane, and polystyrene can be used as the resin material. Ordinary foaming agent such as sodium bicarbonate, an azo compound, an isocyanate compound, and an organic solvent such as, hexane or benzene may be used instead of the above-mentioned foaming agent. An electrically conducting treatment by non-electric plating is performed on the surfaces of cells of the plastic foam. Then, a metal such as Ni is deposited on the surfaces of cells of the plastic foam by electric plating to form a skeleton structure of the metal. Finally, heat treatment is carried out at a temperature higher than the decomposition temperature of the resin, such as at 500° C. or a higher temperature, to decompose the resin and obtain the reforming catalyst body 8 comprising the skeleton structure of the metal, i.e., the porous metal body 8a, and the reforming catalyst 7 included therein.

In the above-mentioned preparation process, the reforming catalyst 7 comprising a catalytic active substance already supported on a carrier (catalyst carrier) is used as the reforming catalyst material shown in FIG. 4. However, there may be adopted a modification in which a catalyst carrier alone is used as a material corresponding to the reforming catalyst material shown in FIG. 4 and the catalytic active substance is supported by deposition by dipping in a solution of Ni at the time of the electrically conducting treatment or after the heat treatment in the process shown in FIG. 4.

In the foregoing embodiment, a fused carbonate fuel cell of the type where the reforming catalyst body is arranged in the fuel gas passage to effect the reforming (conversion) reaction is illustrated. However, the reforming catalyst body may be arranged in a manifold of the fused carbonate-type fuel cell.

As is apparent from the foregoing description, according to the present invention, since a reforming catalyst body comprising a reforming catalyst secured or held in a porous body is arranged in a fuel gas passage, uniform contact can be attained between the reforming catalyst and the raction gas. Therefore, the reforming catalyst can be effectively utilized. Furthermore, propagation of wetting by the electrolyte is prevented and reduction of the activity of the reforming catalyst can be controlled to a very low level, and a fused carbonate-type fuel cell having a reforming catalyst that can be easily handled can be provided.

We claim:

1. A fused carbonate-type fuel cell comprising
   a fused carbonate electrolyte matrix,
   a first and second electrodes in contact with the opposite surfaces of the electrolyte matrix, the first electrode being positioned on a fuel gas side and the second electrode being positioned on an oxidizing gas side,
   a partition plate for supporting the first electrode on the fuel gas side and a supporting plate for supporting the second electrode on the oxidizing gas side,
   an oxidizing gas passageway adjacent to the supporting plate for supporting the second electrode, and
   a fuel gas passageway adjacent the supporting plate for supporting the first electrode, which passageway contains a reforming catalyst which comprises catalyst particles supported on a carrier held in a metallic porous body disposed in the fuel gas passageway.

2. A fused carbonate type fuel cell according to claim 1, wherein the porous body is a porous metal body.

3. A fused carbonate type fuel cell according to claim 2, wherein the porous metal body is composed of nickel or a nickel alloy.

4. A fused carbonate type fuel cell according to claim 2, wherein the porous metal body is a foamed metal.

5. A fused carbonate type fuel cell according to claim 4, wherein the foamed metal is composed of nickel or a nickel alloy.

6. The fused carbonate type fuel cell of claim 1, wherein the catalyst is nickel based and the porous metal body is comprised of nickel or a nickel alloy.

7. The fused carbonate type fuel cell of claim 6, wherein the carrier is an alumina, magnesia based carrier.

8. The fused carbonate type fuel cell of claim 6 wherein the carrier is comprised of lithium aluminate.

9. The fused carbonate type fuel cell of claim 1, wherein said metallic porous body is composed of nickel or a nickel base alloy.

* * * * *